(12) United States Patent
Ballinger et al.

(10) Patent No.: US 6,354,409 B1
(45) Date of Patent: Mar. 12, 2002

(54) BRAKE ROTOR HAVING THERMAL SYMMETRY

(75) Inventors: Robert S. Ballinger, West Chester; Kenneth B. Dunlap, Springfield, both of OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/754,697

(22) Filed: Jan. 3, 2001

(51) Int. Cl.[7] ............................................... F16D 65/12
(52) U.S. Cl. ............................................... 188/218 XL
(58) Field of Search .......................... 188/18 A, 218 R, 188/218 XL

(56) References Cited

U.S. PATENT DOCUMENTS

| 4,263,992 A | * | 4/1981 | Moore et al. ......... 188/218 XL |
| 4,501,346 A | * | 2/1985 | Bogenschutz ......... 188/218 XL |
| 6,119,820 A | * | 9/2000 | Steptoe et al. ............ 188/71.6 |

* cited by examiner

Primary Examiner—Chris Schwartz
(74) Attorney, Agent, or Firm—Scott A. McBain

(57) ABSTRACT

The present invention provides a brake rotor including a central disc portion and an extending portion located at a periphery of the central disc portion. A friction portion having a first friction plate is attached to the extending portion and a second friction plate is attached to the first friction plate. The extending portion can be a "U" shaped configuration adapted to allow the first friction plate to expand in a radial direction in an amount substantially equal to the second friction plate under a condition of elevated temperature.

15 Claims, 4 Drawing Sheets

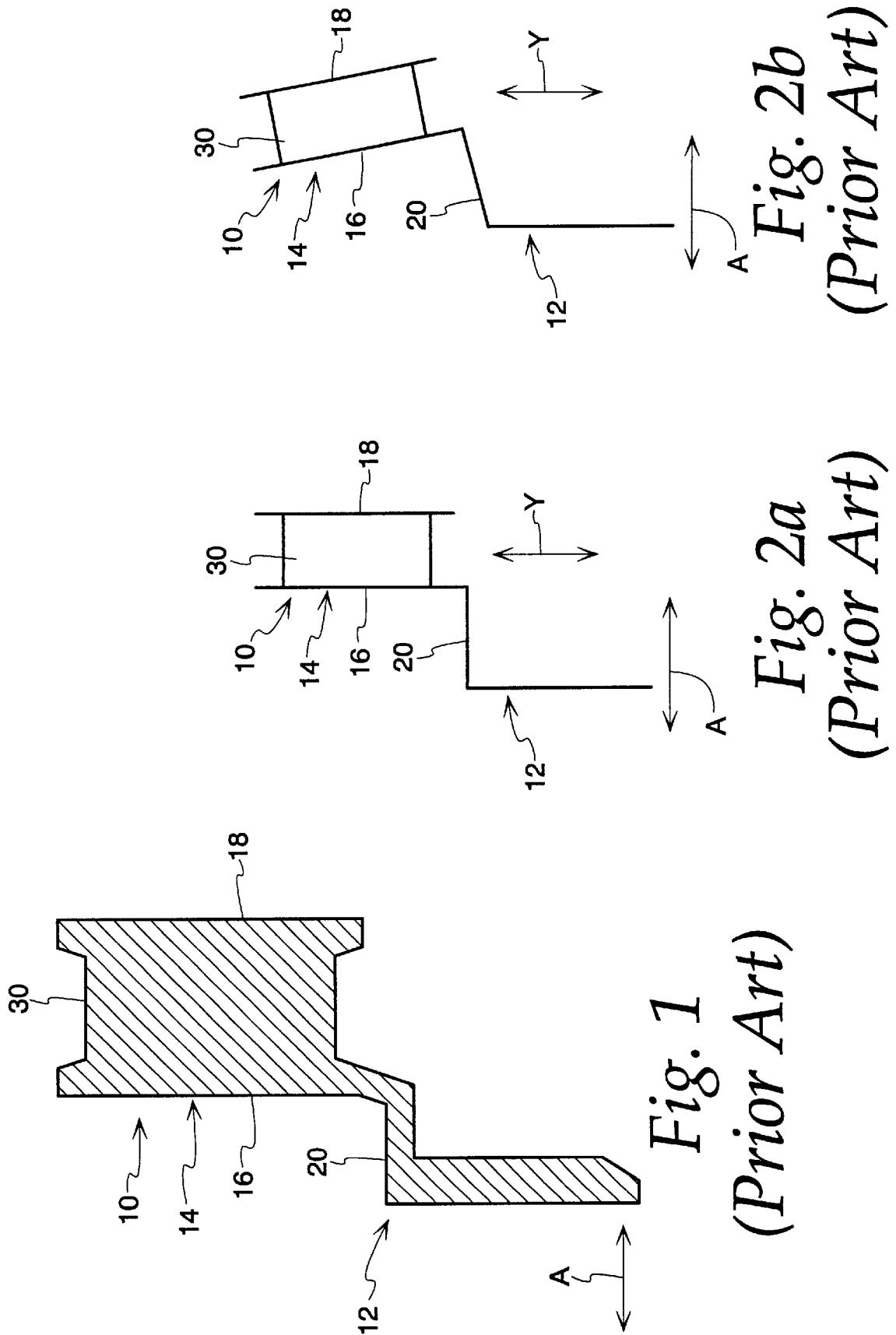

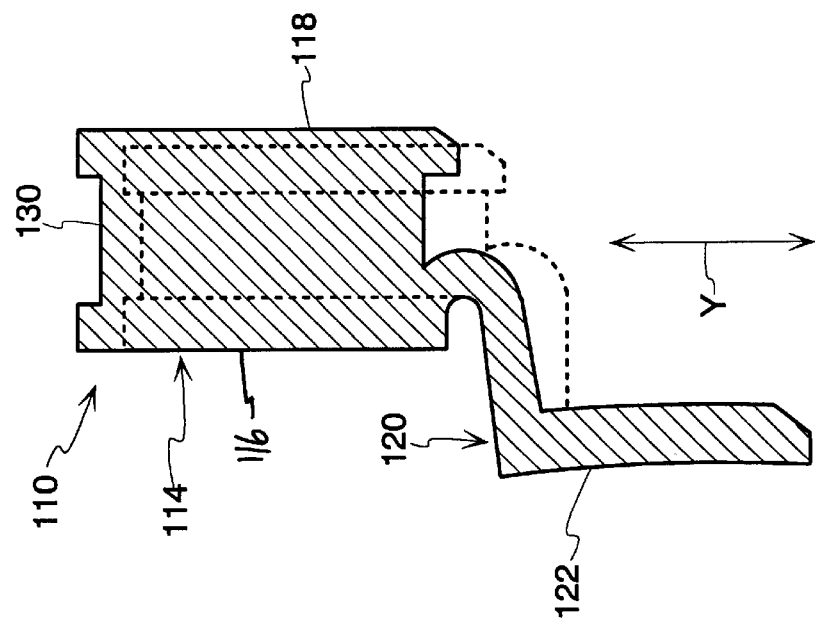
Fig. 7
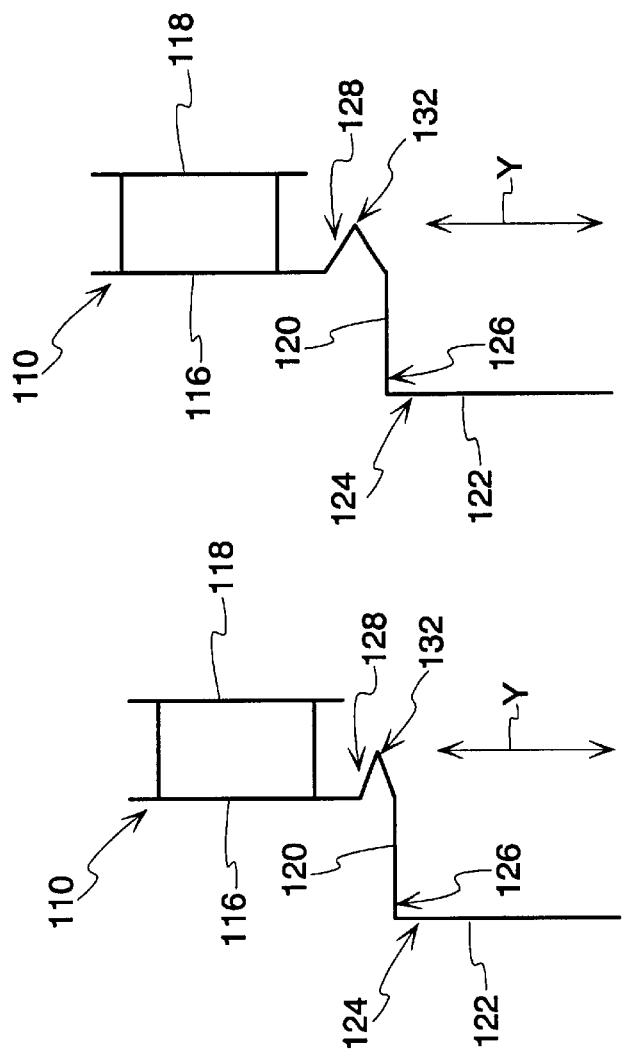
Fig. 6b
Fig. 6a

BRAKE ROTOR HAVING THERMAL SYMMETRY

TECHNICAL FIELD

The technical field of this disclosure is disc brakes for vehicles and in particular a brake rotor that deforms symmetrically when expanding radially due to elevated heat conditions.

BACKGROUND OF THE INVENTION

Non-uniform pressure distribution of the brake pads applied to the rotor is a key contributor to certain types of brake squeal. Non-uniform pressure distribution can result when linings wear unevenly or become tapered. The taper pattern can take the form of lead-to-trail or inside (hub) to outside diameter. Nonuniform pressure distribution due to tapered wear can result from caliper and shoe deflections or by rotor deformation due to thermal expansion.

Rotor deformation can occur due to thermal expansion of the rotor at high temperatures. During operation, heat is generated in the brake rotor as the kinetic energy of the moving vehicle is converted to heat energy through the frictional interface between brake pads forcibly applied against the brake rotor friction plates. One effect of overheating of brake components is warping or coning of the brake rotor. It is believed that as the rotor expands in the radial direction, the hat section that is bolted to the hub acts as a restraint to prevent the outboard surface plate (cheek) from expanding. The inboard plate attached to the outboard plate by way of the vanes is free at the inside diameter. Therefore, the inboard plate has less resistance to radial expansion than the outboard plate. Consequently, as the rotor expands in the radial direction due to elevated temperature conditions, a lateral deformation or a coned shape results. This coning of the rotor at elevated temperatures can cause a tapered wear condition from the inside diameter to the outside diameter. The inboard lining will show more wear at the inside diameter and the outboard lining shows more wear at the outside diameter. When the rotor cools back towards the original temperature, the pad pressure distribution becomes different than a rotor in an unworn condition. The result is higher pad pressures at the outside diameter of the inboard pad and at the inside diameter of the outboard pad. This non-uniform pressure distribution can contribute to the excitation of certain squeal modes, especially at lower temperatures and low pressures.

As shown in FIGS. 1 and 2A, a conventional rotor 10 includes hat section or central attachment portion 12 of a rotor attached to an associated axle (not shown). The hat section 12 is attached to a friction portion 14. The friction portion 14 includes a pair of spaced, parallel rotor plates 16, 18 (also referred to as a friction plate or cheek). The friction portion 14 is attached to the central attachment portion 12 by an extending, attachment or side portion 20 that attaches the hat portion 10 of the rotor 12 directly to the outboard rotor plate 16. It is believed that this conventional method of attachment contributes to the non-symmetrical expansion of the friction plates.

FIG. 1 illustrates a conventional rotor 10 with an outboard plate 16 attached to an inboard plate 18 by a solid connecting portion represented at 30. It can be seen that the rotor plates 16, 18 (held in a parallel relationship by the connecting portion 30) are held in a parallel orientation with the central attachment portion 12. Since the central attachment portion 12 is perpendicular to an associated axle (not shown) oriented in direction A, the friction portion 14 is also held perpendicular to the axle.

FIG. 2A illustrates the conventional rotor 10 with an extending side portion 20. The extending side portion 20 extends at right angles from the central attachment portion 12. Friction portion 14 has plates 16, 18 oriented at right angles to the extending side portion 20. As shown represented in FIG. 2B and illustrated in FIGS. 3 and 4, when heated to an elevated temperature, the friction plates 16, 18 are deformed out of alignment with the axial direction Y.

Therefore, it would be advantageous to provide a brake rotor having thermally symmetric expansion properties to reduce rotor distortion during an elevated temperature condition.

SUMMARY OF THE INVENTION

One aspect of the present invention provides a brake rotor including a central disc portion and an extending portion located at a periphery of the central disc portion. A friction portion having a first friction plate is attached to the extending portion and a second friction plate is attached to the first friction plate. The extending portion is adapted to allow the first friction plate to expand in a radial direction in an amount substantially equal to the second friction plate under a condition of elevated temperature.

In another aspect of the present invention, the first friction plate, under a condition of elevated temperature, expands a first radial distance and the second friction plate expands a second radial distance. The first radial distance is substantially equal to the second radial distance.

In another aspect of the present invention, the first friction plate is an outboard friction plate and the second friction plate is an inboard friction plate. In yet another embodiment, the first friction plate is an inboard friction plate and the second friction plate is an outboard friction plate.

In another aspect of the present invention, the extending portion of the brake rotor can include one or more of a U-shape, an arcuate shape, a V-shape, and a double opposed spring shape.

Another aspect of the present invention includes a method for allowing substantially equal radial expansion of an inboard and an outboard friction plate in a brake rotor under elevated temperatures. The method includes providing an extending portion between a central attachment portion of a brake rotor and the outboard friction plate and expanding the extending portion in the radial direction a distance to maintain substantially equal radial movement of the outboard friction plate and inboard friction plate.

The foregoing and other features and advantages of the invention will become further apparent from the following detailed description of the presently preferred embodiments, read in conjunction with the accompanying drawings. The detailed description and drawings are merely illustrative of the invention rather than limiting, the scope of the invention being defamed by the appended claims and equivalents thereof.

BRIEF DESCRIPTION OF THE DRAWINGS

FIG. 1 illustrates a partial cross-sectional view of a prior art brake rotor;

FIG. 2A is a representation of the prior art brake rotor shown in FIG. 1 at an temperature;

FIG. 2B is a representation of the single cantilevered spring-like action of the prior art brake rotor of FIG. 2A at an elevated temperature undergoing thermal deformation;

FIG. 6A is a representation of FIG. 5 at an ambient temperature;

FIG. 6B is a representation of FIG. 6A at an elevated temperature;

FIG. 7 is a plot of one embodiment of the present invention shown in FIG. 5 at an elevated temperature;

DESCRIPTION OF THE PREFERRED EMBODIMENT

Figure 5:
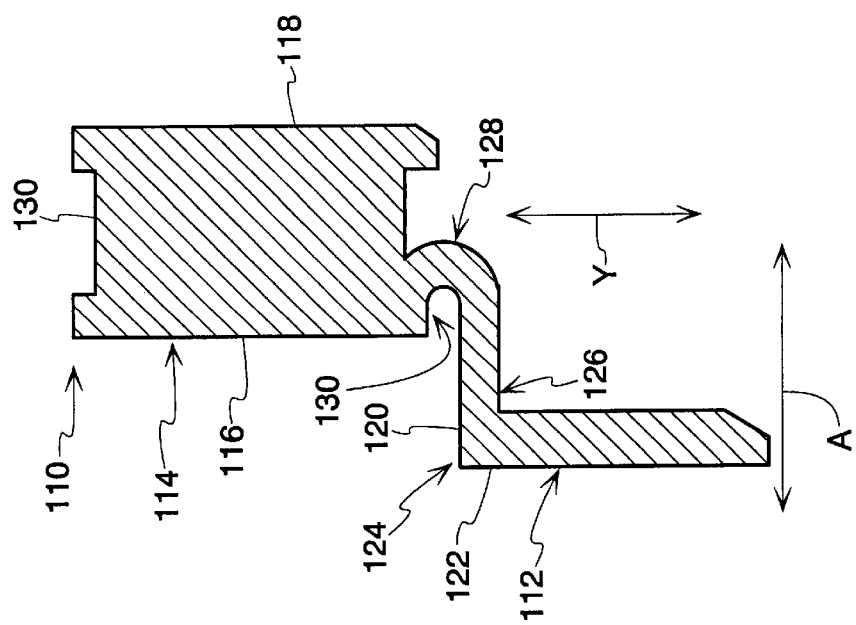
FIG. 5 is a partial cross-sectional view of one embodiment of a brake rotor present invention.
Figure 4:
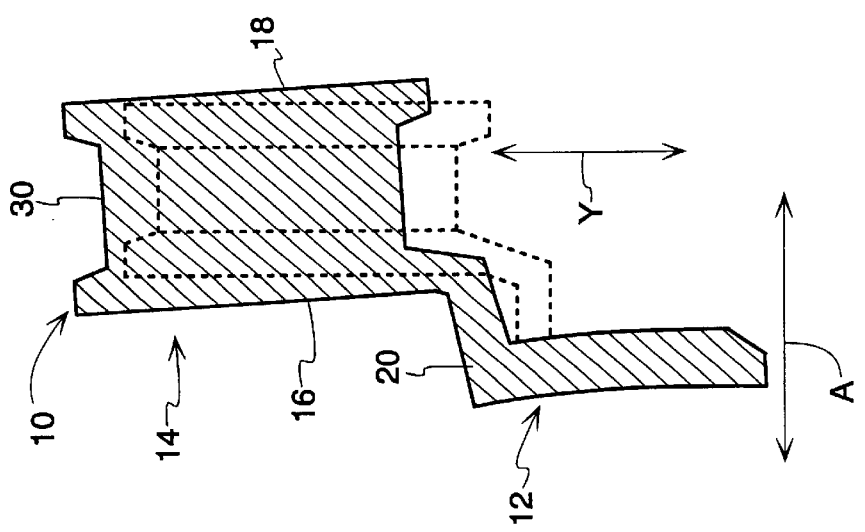
FIG. 4 is a plot of the prior art brake rotor of FIG. 3 undergoing thermal deformation.
Figure 3:
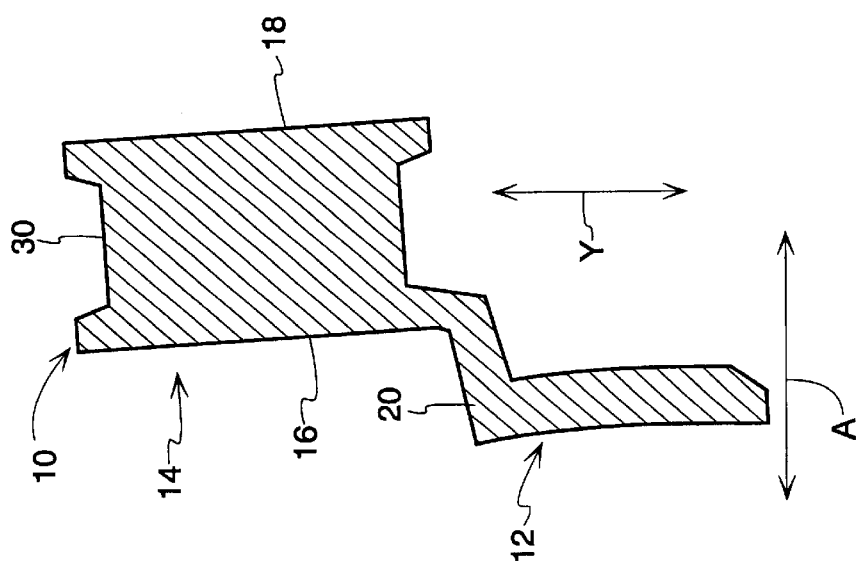
FIG. 3 depicts a partial cross-sectional view of the prior art brake rotor of FIG. 1 undergoing thermal deformation.

With reference to FIG. 5, one embodiment of the present invention is shown. A rotor 110 for a vehicle disc brake includes a central attachment portion 112, including a disc portion 122. The disc portion 122 of the central attachment portion 112 is attached to a vehicle axle (not shown) by any known fastening method known in the art. The disc portion 122 can be attached with a fastener. In one embodiment, for example, bolts (not shown) may be used and spaced adjacent the periphery 124 of the disc 122. An extending portion, generally shown at 120, extends from the periphery 124 of the disc portion 122 in an inward axial direction.

A first end portion 126 of the extending portion 120 is attached to the periphery 124 of the disc portion 122. A second end portion 128 of the extending portion can have a "U" shape or arcuate shape that attaches to a friction portion shown generally at 114. The friction portion 114 includes a pair of first and second (or outward and inner) friction plates 116, 118. The first and second friction plates 116, 118 are parallel annular friction surfaces or cheeks that can be attached and spaced apart by a solid core portion 130 or a plurality of vanes (not shown) as is known in the art. The U-shaped second end portion 128 of the extending portion 120 extends from the first end portion 126 in an inward axial direction and curves outwardly to extend in an outward axial direction to attach to the friction portion 114. In this embodiment, the second end portion 128 attaches to core portion 130 of a first friction plate 116, which is the outward oriented friction plate of the friction portion 114.

During use of the vehicle and resulting heating of the rotor 110, the configuration of the extending portion 120 allows the friction portion 114 to expand in a radial direction without deforming significantly out of the radial plane Y. Thus, uneven wear on the friction plates 116, 118 is reduced or eliminated.

The extending portion 120 may take various forms, one of which is depicted in FIGS. 6A and 6B. The extending portion 120 is attached to the periphery of the central disc 122. A first end portion 126 of the extending portion 120 is attached to the periphery 124 of the central disc 122. A second end portion 128 is attached to friction portion 116. Forming part of or adjacent the second end portion 128 is a portion that is in the form of a "V" or a double-opposed spring 132.

FIG. 6A shows the rotor 110 in an unheated or ambient temperature condition. It can be seen that the first and second friction plates 116, 118 are parallel to the axial direction Y and the central disc portion 122. In this position the first and second friction plates 116, 118 and would be worn substantially evenly during braking. FIG. 6B represents the rotor 110 of FIG. 6A in an exaggerated condition of elevated temperature, as would be experienced after heavy or repeated braking. It can be seen that the friction portion first and second friction plates 116, 118 have maintained a parallel relationship with the direction Y and the central disc portion 122 and would be worn substantially evenly during braking. Thus, uneven wear on the friction plates is reduced or eliminated.

FIG. 7 depicts a plot for the lateral deflection, i.e., deformation, due to thermal expansion for the rotor 110 of FIG. 5 with same reference characters designating same elements. As in FIG. 5, rotor 110 includes disc portion 122 with extending portion 120 connecting to friction plates 116, 118. It can be seen that the orientation of the plates 116, 118 connected by portion 130 is maintained substantially within radial plane Y without coning due to thermal expansion.

Figures 8, 9:
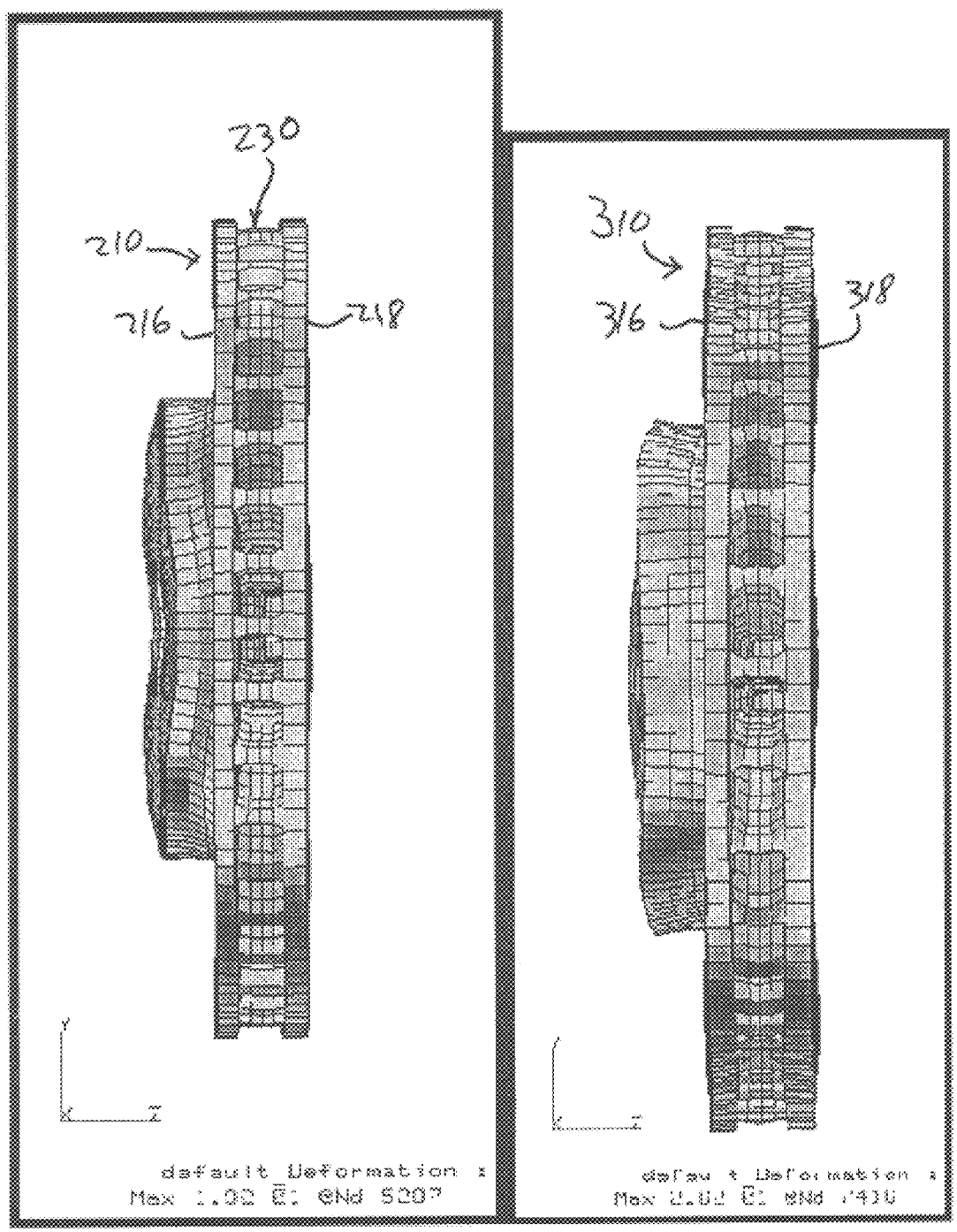
FIG. 8 is a side view of one embodiment of the present invention depicting the amplitude of one mode.
FIG. 9 is a side view of a prior art rotor depicting the greater amplitude of the same node as in FIG. 8.

The present invention also has the effect of ensuring that important radial and longitudinal (circumferential) mode shapes of the installed vane rotor maintain in-plane deflection shapes with minimal out-of-plane motion. This reduces the possibility of coupling with mode shapes having primarily out-of-plane (normal) motion, thereby reducing the propensity for brake squeal. FIG. 8 illustrates a vibration mode in a rotor 210 of one embodiment of the present invention using a plurality of vanes 230 to connect the first and second friction plates. Specifically, the plates of the inventive rotor 210 demonstrate significantly less out-of-plane motion than the plates 316, 318 of the prior art rotor 310 shown in FIG. 9.

The above-described implementations of this invention are example implementations. Moreover, various other improvements and modifications to this invention may occur to those skilled in the art and those improvements and modifications will fall within the scope of this invention.

What is claimed is:

1. A brake rotor comprising:

a central disc portion and an extending portion located at a periphery of the central disc portion, wherein the extending portion includes a U-shaped portion; and a friction portion having a first friction plate attached to the extending portion and a second friction plate attached to the first friction plate, wherein the extending portion allows the first friction plate to expand a first radial distance and the second friction plate to expand a second radial distance, the first radial distance being substantially equal to the second radial distance, under a condition of elevated temperature.

2. The brake rotor of claim 1 wherein the extending portion includes a V-shaped portion.

3. The brake rotor of claim 2 wherein the V-shaped portion includes a first portion attached at an end to a second portion to form an angle that increases under a condition of elevated temperature.

4. The brake rotor of claim 2 wherein the V-shaped portion includes a double opposed spring shaped configuration.

5. The brake rotor of claim 1 wherein the first friction plate and the second friction plate are substantially maintained in a radially extending plane.

6. The brake rotor of claim 1 wherein the first friction plate is an outboard friction plate and the second friction plate is an inboard friction plate.

7. The brake rotor of claim 1 wherein the central disc portion is maintained parallel to the first friction plate and the second friction plates.

8. The brake rotor of claim 1 wherein the extending portion includes a first portion substantially perpendicular to the central disc portion, and a second arcuate portion which attaches to the first friction plate.

9. The brake rotor of claim 1 wherein the first friction plate is an inboard friction late and the second friction plate is an outboard friction plate.

10. A method for allowing substantially equal radial expansion of first and second friction plates in a brake rotor under elevated temperatures comprising:

provided a U-shaped extending portion between a central disc portion of a brake rotor and the first friction plate; and expanding the U-shaped extending portion in the radial direction a distance to maintain substantially equal radial movement of the first friction plate and second friction plate.

11. The method of claim 10 wherein the first friction plate is an outboard friction plate and the second friction plate is an inboard friction plate.

12. The method of claim 10 wherein the first friction plate is an inboard friction plate and the second friction plate is an outboard friction plate.

13. The method of claim 10 further comprising expanding the first friction plate a first radial distance and expanding the second friction plate a second radial distance, the first radial distance being substantially equal to the second radial distance.

14. The method of claim 10 wherein the extending portion includes a V-shaped portion.

15. A brake rotor assembly for allowing substantially equal radial expansion of first and second friction plates in a brake rotor under elevated temperatures comprising:

means for maintaining a substantially equal radial movement of a first friction plate and a second friction plate, said means including one of a U-shaped and V-shaped extending portion attached to one of the first and second plates.

* * * * *